US011122120B2

(12) United States Patent
Bolen et al.

(10) Patent No.: US 11,122,120 B2
(45) Date of Patent: Sep. 14, 2021

(54) OBJECT NOTIFICATION WHEREIN COMPARE AND SWAP IS PERFORMED

(71) Applicant: INTERNATIONAL BUSINESS MACHINES CORPORATION, Armonk, NY (US)

(72) Inventors: David Brittain Bolen, Chicago, IL (US); Wesley Leggette, Chicago, IL (US); Brian Frederick Ober, Lake in the Hills, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/423,572

(22) Filed: May 28, 2019

(65) Prior Publication Data

US 2020/0382589 A1    Dec. 3, 2020

(51) Int. Cl.
*H04L 29/08* (2006.01)

(52) U.S. Cl.
CPC .......... *H04L 67/1097* (2013.01); *H04L 67/26* (2013.01)

(58) Field of Classification Search
CPC ... G06F 13/00; G06F 8/71; G06F 9/54; G06F 9/542; G06F 16/21; G06F 16/28; G06F 16/215; G06F 16/219; G06F 16/289; G06F 16/2336; G06F 16/2458; G06F 16/2474; G06F 16/24573; G06F 17/30008; G06F 17/30286; G06F 17/30309; G06F 17/30595; G06F 3/06; G06F 3/061; G06F 3/064; G06F 3/067; G06F 3/0605; G06F 3/0613; G06F 3/0614; G06F 3/0617; G06F 3/0643; G06F 3/0659; G06F 3/0689; G06F 11/10; G06F 11/106; G06F 11/1004; G06F 11/1008; G06F 11/1076; G06F 12/00; G06Q 30/02; H04L 29/06; H04L 29/0809; H04L 29/08072; H04L 29/08117; H04L 67/00; H04L 29/08; H04L 67/02; H04L 67/26; H04L 67/1097; G11C 2029/0411; G11C 29/00; G11B 20/1833; H05K 999/99
USPC .......... 707/695; 709/219; 711/154; 714/764, 714/766
See application file for complete search history.

(56) References Cited

U.S. PATENT DOCUMENTS

| 9,430,286 | B2 | 8/2016 | Volvovski |
| 9,774,679 | B2 | 9/2017 | Storm |
| 2010/0332751 | A1 | 12/2010 | Quigley |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Robert B Harrell
(74) *Attorney, Agent, or Firm* — Alexis N. Hatzis

(57) ABSTRACT

A method, computer system, and a computer program product for object notifications is provided. The present invention may include receiving a requestor's operation. The present invention may then include determining that a notification describing the requestor's operation should be sent. The present invention may then include determining whether the requestor's operation is successful or unsuccessful, and the present invention may lastly include deleting an in-memory object.

15 Claims, 6 Drawing Sheets

(56) References Cited

U.S. PATENT DOCUMENTS

| | | | | |
|---|---|---|---|---|
| 2012/0284244 | A1* | 11/2012 | Kamimura | G06F 9/466 |
| | | | | 707/703 |
| 2016/0188407 | A1* | 6/2016 | Bronnikov | G06F 11/1076 |
| | | | | 714/764 |
| 2016/0306574 | A1* | 10/2016 | Friedman | G06F 3/0638 |
| 2016/0308968 | A1* | 10/2016 | Friedman | H04L 29/08072 |
| 2017/0054824 | A1* | 2/2017 | Friedman | G06F 3/0656 |
| 2017/0149890 | A1* | 5/2017 | Shamis | G06F 15/17331 |
| 2017/0155520 | A1 | 6/2017 | Hegde | |
| 2019/0370237 | A1* | 12/2019 | Cheru | G06F 16/2336 |

OTHER PUBLICATIONS

Grace Period Disclosure, Bolen, et al., "IBM Cloud Object Storage System Version 3.14.0", IBM Cloud Object Storage System: Release Notes, Oct. 13, 2018, 51 Pages, [Retrieved from: http://www.ibm.com/support/fixcentral/swg/quickorder?parent=Software%20defined%20storage&product=ibm/StorageSoftware/IBM+Cloud+Object+Storage+System&release=3.14.0.23&platform=All&function=all&source=fc].

* cited by examiner

OBJECT NOTIFICATION WHEREIN COMPARE AND SWAP IS PERFORMED

STATEMENT REGARDING PRIOR DISCLOSURES BY THE INVENTOR OR A JOINT INVENTOR

The following disclosure is submitted under 35 U.S.C. 102(b)(1)(A):
DISCLOSURE: "IBM Cloud Object Storage System Version 3.14.0," Bolen, et al., IBM Cloud Object Storage System: Release Notes, Oct. 13, 2018, 51 Pages.

BACKGROUND

The present invention relates generally to the field of computing, and more particularly to cloud object storage.

Computing devices may communicate data, process data and/or store data, among other things. Computing devices may include, but are not limited to including, wireless phones and/or tablets, personal computers, laptops, workstations, gaming devices, and data centers that support a large number of web searches, stock trades, and/or online purchases daily. A computing device may include a central processing unit (CPU), a memory system, a user input and/or an output interface, a peripheral device interface, and an interconnecting bus structure, among other things.

A computing device may extend the central processing unit (CPU) by implementing a cloud computing service to perform one or more computing functions, including but not limited to services, applications, algorithms, and/or functions which may have otherwise been performed by the computing device.

SUMMARY

Embodiments of the present invention disclose a method, computer system, and a computer program product for object notifications. The present invention may include receiving a requestor's operation. The present invention may then include determining that a notification describing the requestor's operation should be sent. The present invention may then include determining whether the requestor's operation is successful or unsuccessful, and the present invention may lastly include deleting an in-memory object.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
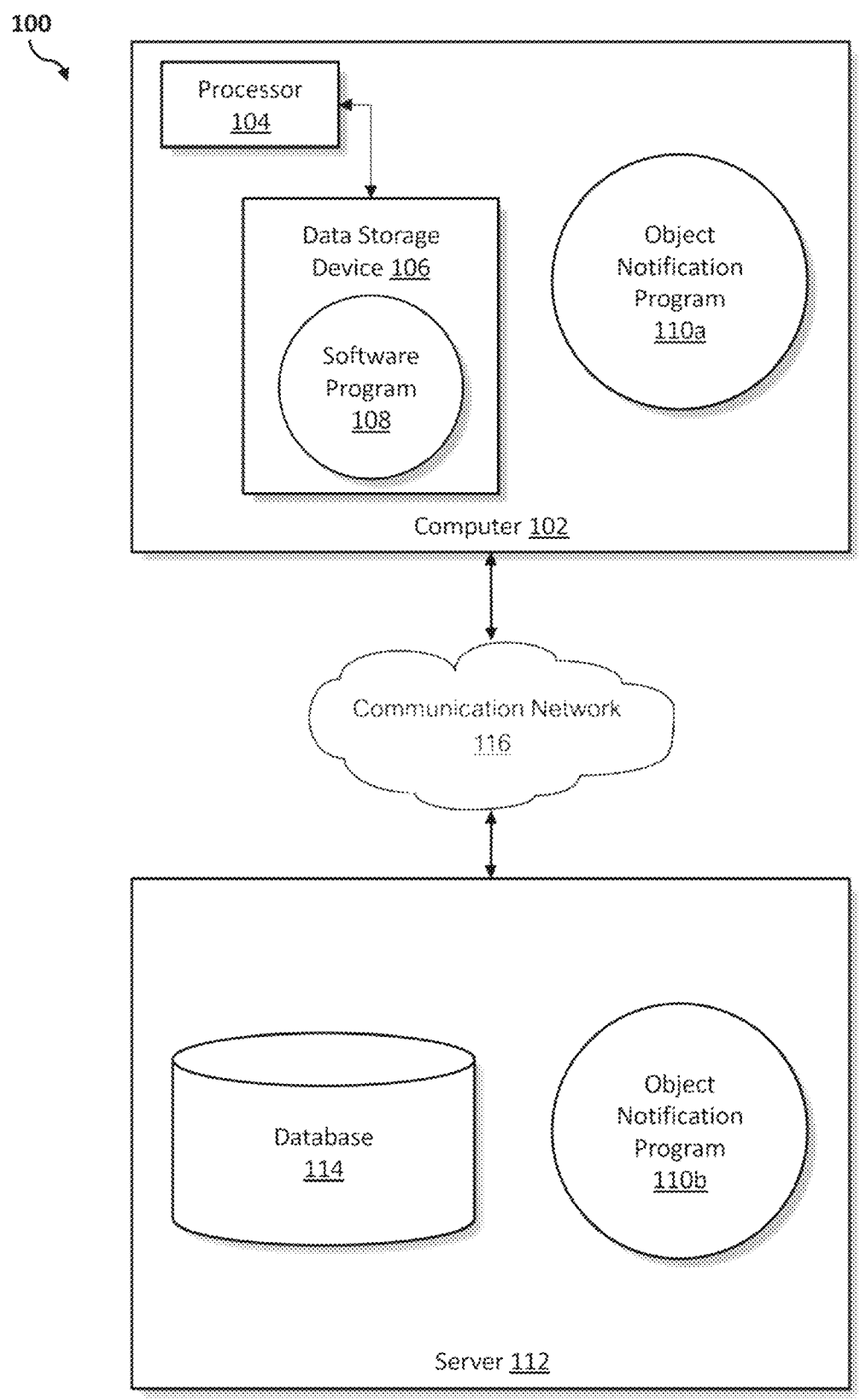
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for object notification. As such, the present embodiment has the capacity to improve the technical field of cloud object storage by notifying external services of object events. More specifically, the present invention may include receiving a requestor's operation. The present invention may then include determining that a notification describing the requestor's operation should be sent. The present invention may then include determining whether the requestor's operation is successful or unsuccessful, and the present invention may lastly include deleting an in-memory object.

As described previously, computing devices may communicate data, process data and/or store data, among other things. Computing devices may include, but are not limited to including, wireless phones and/or tablets, personal computers, laptops, workstations, gaming devices, and data centers that support a large number of web searches, stock trades, and/or online purchases daily. A computing device may include a central processing unit (CPU), a memory system, a user input and/or an output interface, a peripheral device interface, and an interconnecting bus structure, among other things.

A computing device may extend the central processing unit (CPU) by implementing a cloud computing service to perform one or more computing functions, including but not limited to services, applications, algorithms, and/or functions which may have otherwise been performed by the computing device. Some services, applications, algorithms, and/or functions may even be performed by one or more cloud computing services in a distributed manner to improve the response time for completion of the service, application, algorithm, and/or function.

In addition, a computing device may use one or more cloud storage services as part of the computing device's memory system. A cloud storage service may enable a user, via a computing device, to store files and/or applications, among other things, on an Internet storage system. The Internet storage system may include a redundant array of independent disks (RAID) system and/or a dispersed storage system which may utilize an error correction scheme to encode data for storage.

With the use of cloud storage services, there may not be a means by which a requestor (e.g., a user storing data using a cloud storage service) may be notified when an object has been added, modified and/or removed from a cloud storage service. The same may be true when an object has been added, modified and/or removed from a private data center.

A requestor may, therefore, create his or her own mechanism to notify the requestor of a successful upload. The requestor may alternatively, or additionally, scan the system for new objects. However, the cost of finding new objects may be expensive in a system where the only interface available provides a list of objects and their modification times. Unless objects are named with a well-defined, time-based prefix, the user must list all objects. This may be a costly system as most objects listed may not be new, and objects may be missed which are created and destroyed between listing cycles. Further, the listing of objects may occur before the creation of an object and there may be a significant time delay before the next listing cycle. Ensuring that no object is missed when using a listing-based solution may be complex to implement.

Therefore, it may be advantageous to, among other things, enable a dispersed storage processing unit to notify external services of events which may occur on user data.

According to at least one embodiment of the present invention, a dispersed storage processing unit may send a notification to the requestor after completing a successful object modifying operation. This may obviate the need for listings by the requestor.

According to at least one embodiment of the present invention, the requestor may use a management unit to create notification configurations which may describe where to send a notification, as well as optional authentication and encryption settings and optional object name and/or operation type filtering.

According to at least one embodiment of the present invention, the requestor may determine a level of reliability that may be needed with a generated notification, including best effort and/or at least one scenario.

According to at least one embodiment of the present invention, different vaults and/or access pools may be assigned to a notification configuration and the vaults and/or vaults deployed to the access pools may begin sending notifications from the dispersed storage processing unit. A vault may be a portion of a namespace used for one or more implementations.

According to at least one embodiment of the present invention, a dispersed storage processing unit may send a notification to an external service, such as Apache Kafka® and/or RABBITMQ® (RabbitMQ is a trademark of Pivotal Software, Inc. in the U.S. and other countries), among others.

According to at least one embodiment of the present invention, a dispersed storage processing unit may use a storage system to keep track of pending notifications in the event of a dispersed storage processing unit failure. The dispersed storage processing unit may keep track of pending notifications by utilizing short-lived notification objects stored in a dispersed storage network memory location, and/or a journaled log on a local disk. Additionally, the dispersed storage processing unit may utilize long term storage for notifications that fail to send, for example, by writing the notifications to DSN memory.

According to at least one embodiment of the present invention, a dispersed storage processing unit may utilize an in-memory object (IMO) that is protected by an error coding function, distributed over a storage pool and kept in memory to store a pending notification.

According to at least one embodiment, the present invention may be extended to handle scenarios whereby a requestor requests notifications for failed operations and/or for non-modifying operations.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an object notification program 110a. The networked computer environment 100 may also include a server 112 that is enabled to run an object notification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the object notification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the object notification program 110a, 110b (respectively) to notify external services of events occurring on user data with a guarantee notification using a dispersed storage processing unit. The object notification method is explained in more detail below with respect to FIGS. 2A and 2B.

Figure 2A:
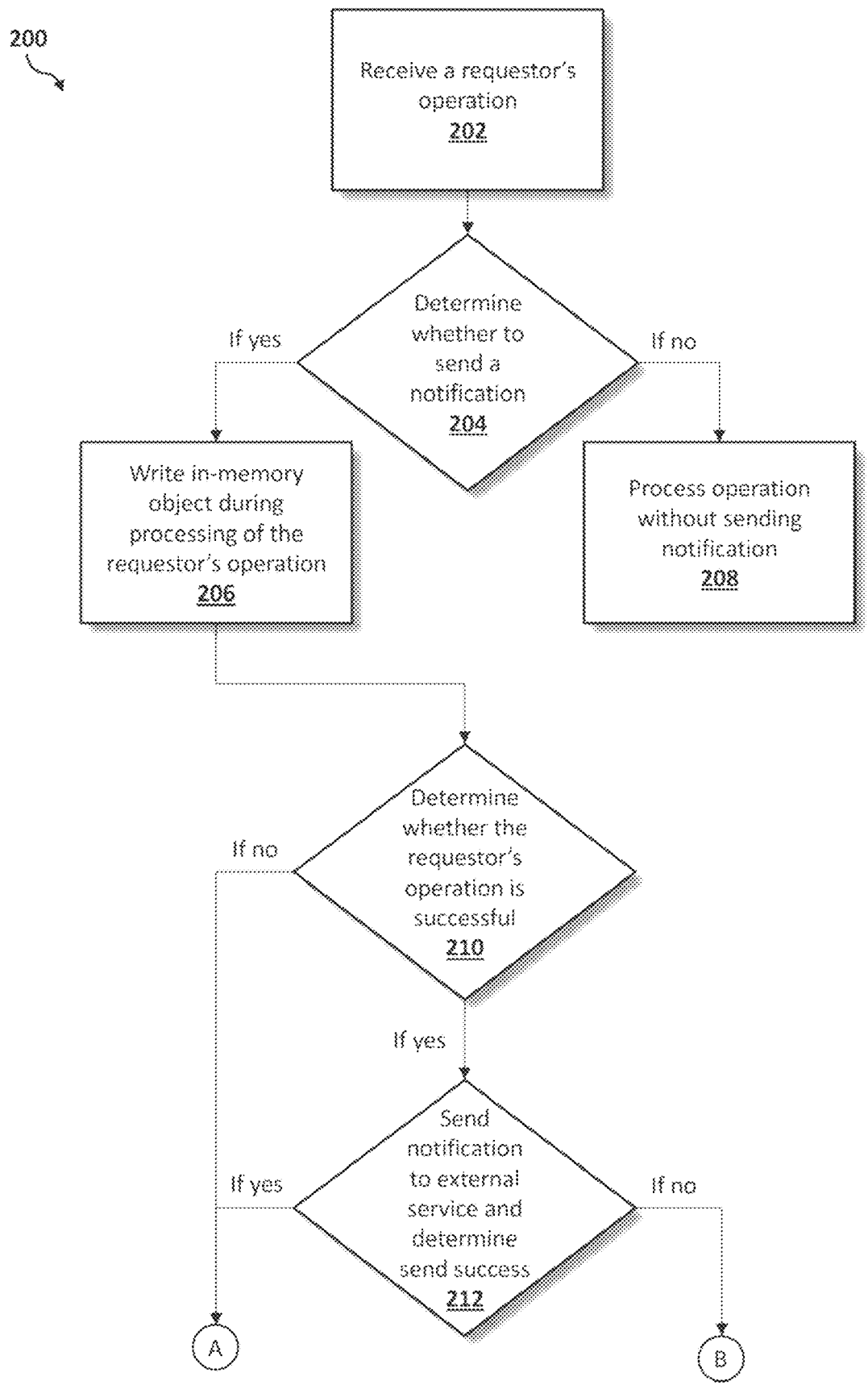
FIGS. 2A and 2B are an operational flowchart illustrating a process for object notification according to at least one embodiment.
Figure 2B:
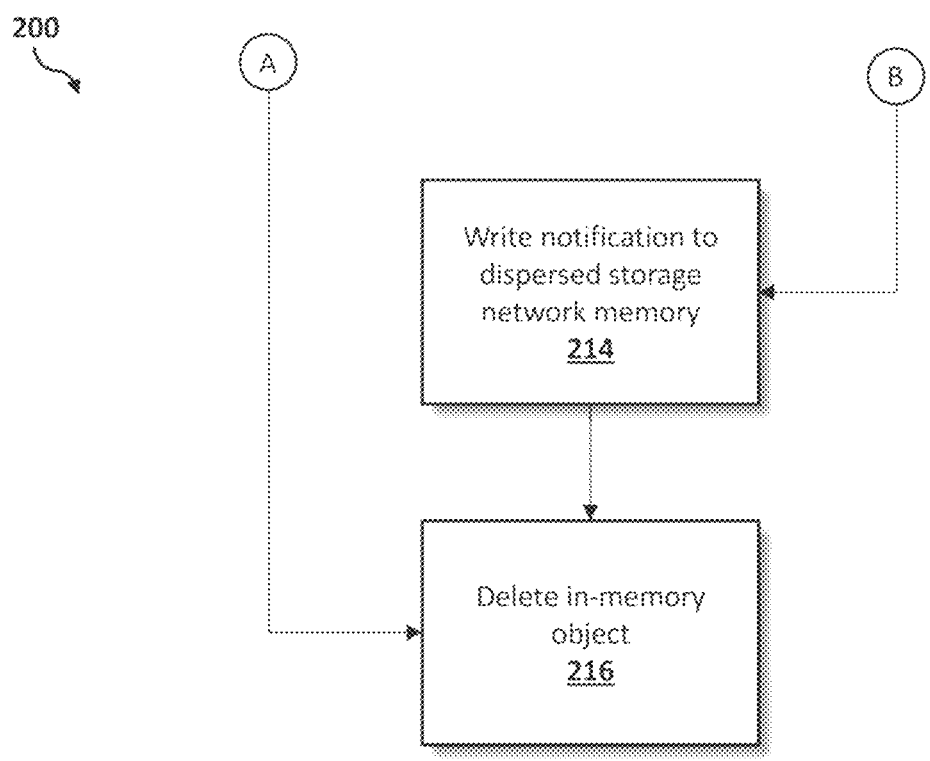

Referring now to FIGS. 2A and 2B, an operational flowchart illustrating the exemplary object notification process 200 used by the object notification program 110a and 110b according to at least one embodiment is depicted.

At 202, a requestor's operation is received. A dispersed storage processing unit may receive the requestor's operation (e.g., an object written to a storage system). As will be described in more detail below, a dispersed storage processing unit may send a notification to the requestor after completing a successful object modifying operation. This may obviate the need for listings by the requestor. The requestor may use a management unit to create notification configurations which may describe where to send a notification, as well as optional authentication and encryption settings and optional object name and/or operation type filtering.

At 204, the object notification program 110a, 110b determines that a notification should be sent. A notification may be a message sent by the dispersed storage processing unit to an external service such as Apache Kafka® and/or RAB-BITMQ® (RabbitMQ is a trademark of Pivotal Software, Inc. in the U.S. and other countries), among others. A notification may describe the operation that occurred. For example, a notification may read that an object named X was written at a time Y containing Z bytes.

A notification may be sent for modifying notifications, failed operations and/or for non-modifying operations, among other things. A decision to send a notification may be filtered based on prefixes and/or suffixes.

According to at least one embodiment of the present invention, the sending of a notification may be guaranteed or non-guaranteed. This implementation choice may affect the reliability that may be ensured in the sending of a notification. For example, a notification may always be sent or the object notification program 110a, 110b may use best efforts in attempting to send the notification.

If the requestor does not require a notification, then the program may not include a notification log, an in-memory object (IMO), or a retry mechanism, as will be discussed in more detail with respect to step 214 below.

At 206, an in-memory object (IMO) is written during the processing of the requestor's operation. A dispersed storage processing unit may use a storage system to keep track of pending notifications in the event of a dispersed storage processing unit failure. The dispersed storage processing unit may keep track of pending notifications by utilizing short-lived notification objects stored in a dispersed storage network memory location, and/or a journaled log on a local disk. Additionally, the dispersed storage processing unit may utilize long term storage for notifications that fail to send, for example, by writing the notifications to DSN memory. A dispersed storage processing unit may utilize an in-memory object (IMO) that is protected by an error coding function, distributed over a storage system and kept in memory to store a pending notification.

If the dispersed storage processing unit determines at 204 that the requestor's operation should send a notification, then the in-memory object (IMO) may be written in parallel with the rest of the object metadata during the processing of the requestor's operation.

An in-memory object (IMO) may be written during the processing of the requestor's operation in a manner similar to the process used by the object itself. The in-memory object (IMO) may be erasure coded and then sent to a slicestores. However, the erasure-coded in-memory object (IMO) may be stored only in memory on the slicestores whereas an object itself may be persisted to a disk.

At 210, the object notification program 110a, 110b determines that the requestor's operation is successful. A requestor's operation may be successful if the in-memory object (IMO), if needed, and all other required data is written successfully. The writing of the in-memory object (IMO) may ensure that the notification data has been preserved against any possible failure of the dispersed storage processing unit, and further, that the notification will be sent. Failure to store any portion of the metadata may result in a failure of the requestor's operation.

Object notifications, for example those discussed in steps 206 through 210 above, may be improved with the use of Compare and Swap N (CASN), which may eliminate the scenario whereby an object may be written but no notification may be sent. CASN may be an atomic compare and swap where all N elements may be compared and swapped or none of the N elements will be compared and swapped. For example, a dispersed storage processing unit may crash after having issued a write of the object's metadata, and the in-memory object (IMO) may fail to write a threshold number of slices before the crash. In this case, the dispersed storage processing unit may not have replied to a requestor, because a response may be sent after the in-memory object (IMO), object data, and metadata are written. A lack of response may, in some circumstances, cause the requestor to perform the operation again, however CASN may assist in resolving this issue. For example, by combining the writes of the in-memory object and the object metadata into a single atomic transaction, there may be no chance that the object may be written when the in-memory object is not. This may eliminate the chance of losing a notification.

Likewise, CASN may be used in an error path. If a notification fails to send, the notification may be written to a dispersed storage network memory location and the in-memory object (IMO) may be deleted. If there is a crash during this process, duplicate notifications may be sent to the dispersed storage network memory location. This may waste both time and storage. By using CASN, the write to dispersed storage network memory location and the deletion of the in-memory object (IMO) may be handled as a single atomic transaction, thereby ensuring that there are no duplicate entries in the dispersed storage network memory location, even in the event of a crash.

Next, at 212, a notification is sent to an external service and it is determined that the send operation is successful. Once the requestor's operation has completed successfully, as described previously with respect to step 210 above, the dispersed storage processing unit may send a notification to an external service such as Apache Kafka® and/or RAB-BITMQ® (RabbitMQ is a trademark of Pivotal Software, Inc. in the U.S. and other countries), among others.

Since it was determined that the send operation is successful, then at 216, the in-memory object (IMO) is deleted. If the notification was sent to the external service, as described previously with respect to step 212 above, then the dispersed storage processing unit may delete the in-memory object (IMO), if one was written earlier to ensure reliability.

A failure to delete the in-memory object (IMO) or to write the notification to a dispersed storage network memory location may be handled by utilizing a background process to search for in-memory objects (IMOs) and to write the in-memory objects (IMOs) to the dispersed storage network memory location.

If, at 204, it was determined that a notification should not be sent, then at 208, the object notification program 110a, 110b processes the requestor's operation without sending a notification.

If, at 210, it was determined that the requestor's operation was not successful, then at 216, the in-memory object (IMO) is deleted. This may be a "done" state because according to at least one embodiment of the present invention, unsuccessfully completing a requestor's operation may have automatically deleted the in-memory object (IMO). Therefore, if at this step the dispersed storage processing unit determined that the requestor's operation was not successful (e.g., that the requestor's write failed), then the dispersed storage processing unit may delete the in-memory object (IMO), as was described previously with respect to step 216 above.

A retry process running on the dispersed storage processing unit may attempt to resend the notification. A retry process may acquire one or more notifications from the dispersed storage network memory location and may attempt to send the notifications to the external service. If the retry process successfully sends the notifications to the external service, then the notification found in the dispersed storage network (DSN) memory location may be deleted.

If, at 212, it was determined that the send operation was unsuccessful, then at 214, the notification is written to a dispersed storage network memory location. As here, if the dispersed storage processing unit fails to send the notification, then a dispersed storage unit may determine that there is an unsent notification and an in-memory object (IMO), and may write the unsent notification to dispersed storage network (DSN) memory location. Once the in-memory object (IMO) has been written to the dispersed storage network location, the in-memory object (IMO) may be deleted, as was described previously with respect to step 216 above.

It may be appreciated that FIGS. 2A and 2B provide only an illustration of one embodiment and do not imply any limitations with regard to how different embodiments may be implemented. Many modifications to the depicted embodiment(s) may be made based on design and implementation requirements.

Figure 3:
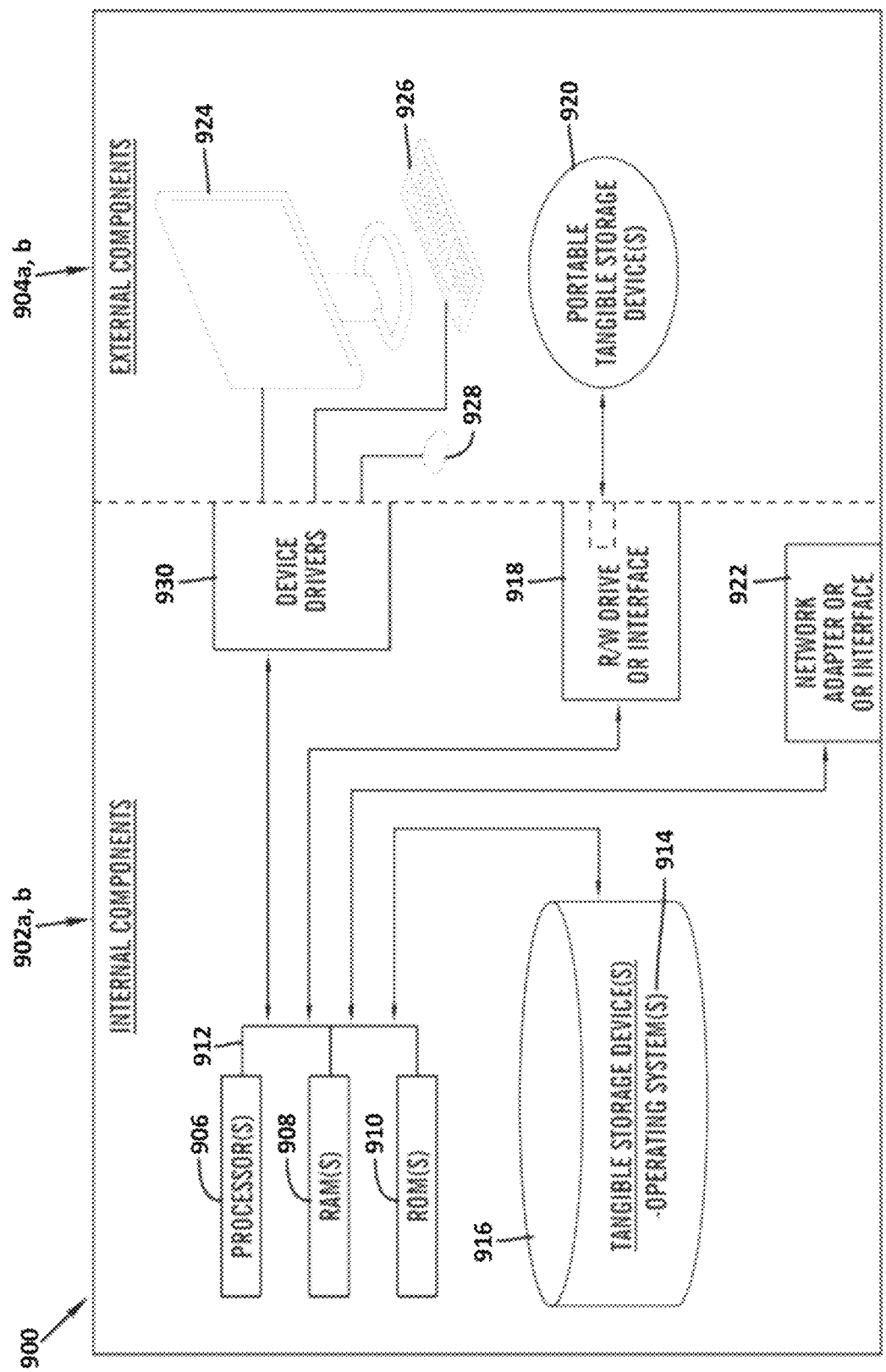
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the object notification program 110a in client computer 102, and the object notification program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the object notification program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the object notification program 110a in client computer 102 and the object notification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the object notification program 110a in client computer 102 and the object notification program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
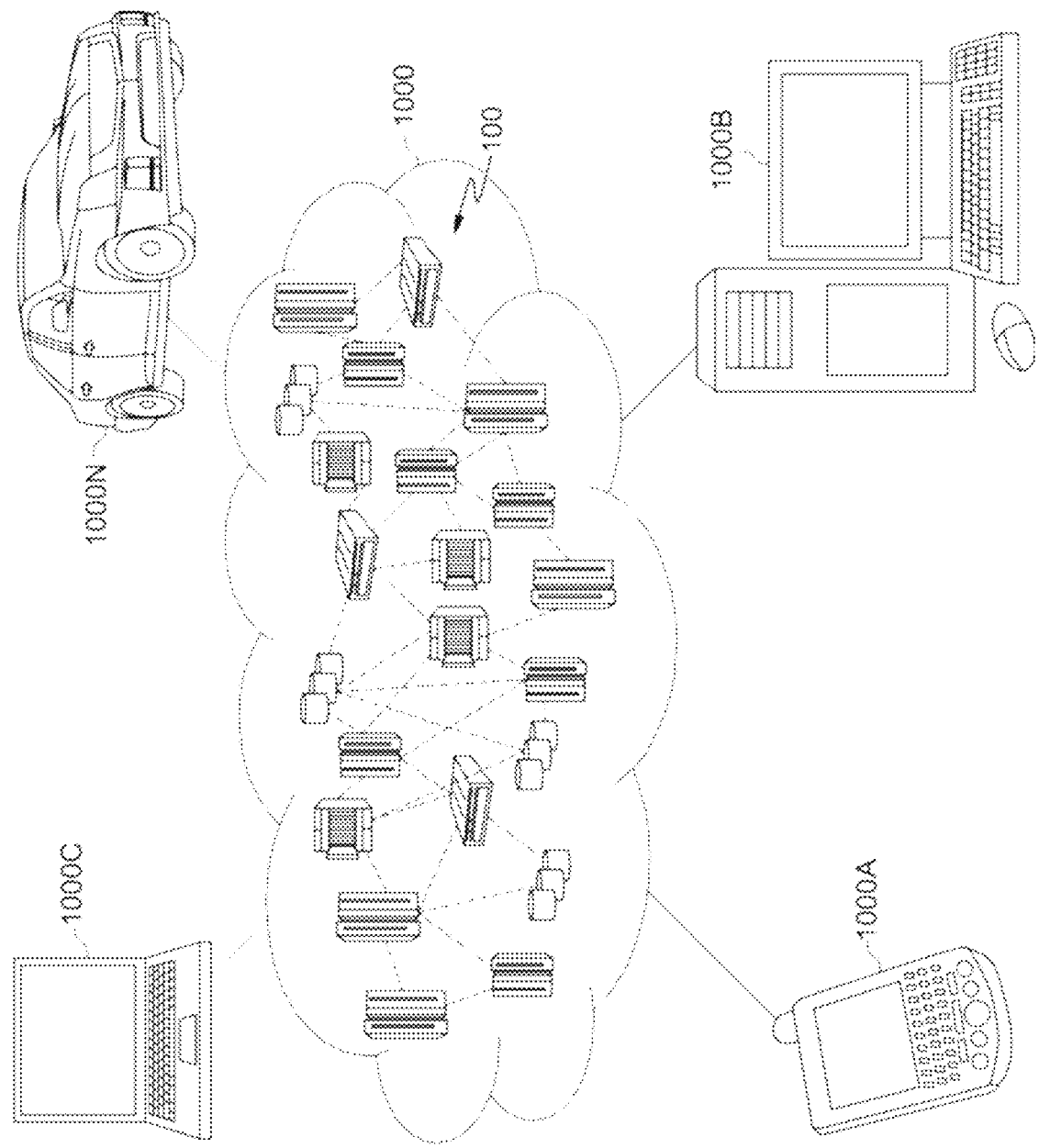
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
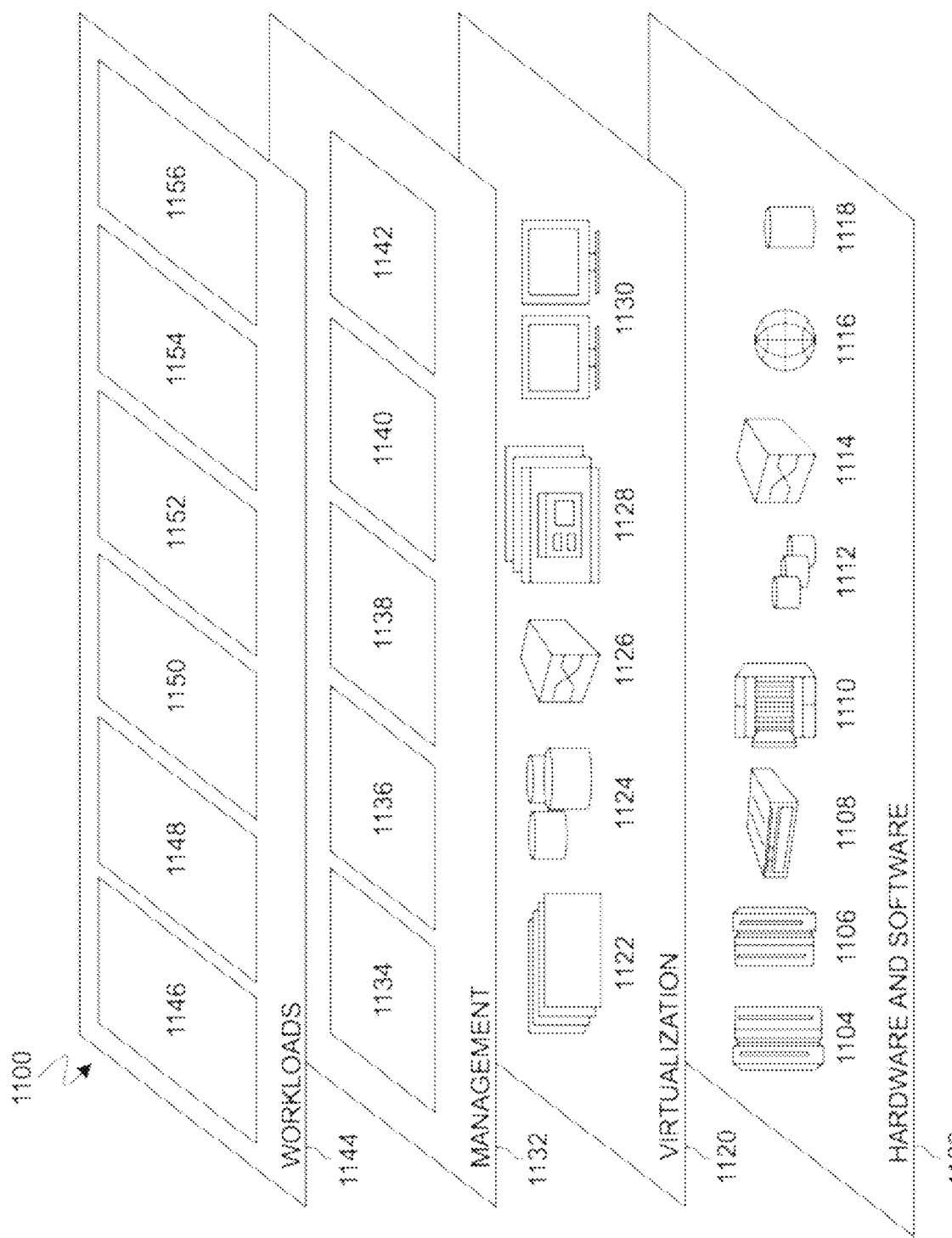
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and object notification 1156. An object notification program 110*a*, 110*b* provides a way to utilize a dispersed storage processing unit to notify external services of events that occur on user data.

More specifically, the object notification program 110*a*, 110*b* may receive a requestor's operation at a dispersed storage processing unit and may send an in-memory object (IMO) in parallel with an object metadata during the processing of the requestor's operation, on determining the requestor's operation sends a guaranteed notification. The object notification program 110*a*, 110*b* may also send a notification to an external service by the dispersed storage processing unit on successfully completing the requestor's operation and/or writing a notification to a dispersed storage network memory location and deleting and in-memory object (IMO) if the requestor's operation is not completed successfully.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for object notifications, the method comprising:
   receiving, by a dispersed storage processing unit, a requestor's operation;
   determining that a notification describing the requestor's operation should be sent for modifying operations, failed operations, and/or for non-modifying operations, wherein the notification describing the requestor's operation is guaranteed or non-guaranteed based on an implementation choice of a user, and indicates a name of an object, a time that the object is written, and a number of bytes of the object, and handling the requestor's operation using compare and swap instructions;
   determining whether the requestor's operation is successful or unsuccessful; and
   deleting an in-memory object.

2. The method of claim 1, wherein determining that the notification describing the requestor's operation should be sent further comprises:
   processing the requestor's operation; and
   determining that a requestor requires the notification describing the requestor's operation.

3. The method of claim 2, further comprising:
   writing the in-memory object in parallel with object metadata while processing the requestor's operation, wherein writing the in-memory object includes erasure coding the in-memory object and sending the in-memory object to a slicestores.

4. The method of claim 1, wherein it is determined that the requestor's operation is successful, further comprising:
   sending the notification to an external service; and
   determining whether sending the notification to the external service is successful or unsuccessful.

5. The method of claim 4, wherein it is determined that sending the notification to the external service is unsuccessful, further comprising:
   ensuring that a duplicate notification is not sent to a dispersed storage network memory location by writing the notification to the dispersed storage network memory location and deleting the in-memory object as a single atomic transaction.

6. A computer system for object notifications, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by a dispersed storage processing unit, a requestor's operation;
   determining that a notification describing the requestor's operation should be sent for modifying operations, failed operations, and/or for non-modifying operations, wherein the notification describing the requestor's operation is guaranteed or non-guaranteed based on an implementation choice of a user, and indicates a name of an object, a time that the object is written, and a number of bytes of the object, and handling the requestor's operation using compare and swap instructions;
   determining whether the requestor's operation is successful or unsuccessful; and
   deleting an in-memory object.

7. The computer system of claim 6, wherein determining that the notification describing the requestor's operation should be sent further comprises:
   processing the requestor's operation; and
   determining that a requestor requires the notification describing the requestor's operation.

8. The computer system of claim 7, further comprising:
   writing the in-memory object in parallel with object metadata while processing the requestor's operation, wherein writing the in-memory object includes erasure coding the in-memory object and sending the in-memory object to a slicestores.

9. The computer system of claim 6, wherein it is determined that the requestor's operation is successful, further comprising:
   sending the notification to an external service; and
   determining whether sending the notification to the external service is successful or unsuccessful.

10. The computer system of claim 9, wherein it is determined that sending the notification to the external service is unsuccessful, further comprising:
    ensuring that a duplicate notification is not sent to a dispersed storage network memory location by writing the notification to the dispersed storage network memory location and deleting the in-memory object as a single atomic transaction.

11. A computer program product for object notifications, comprising:

one or more non-transitory computer-readable storage media and program instructions stored on at least one of the one or more non-transitory computer-readable storage media, the program instructions executable by a processor to cause the processor to perform a method comprising:

receiving, by a dispersed storage processing unit, a requestor's operation;

determining that a notification describing the requestor's operation should be sent for modifying operations, failed operations, and/or for non-modifying operations, wherein the notification describing the requestor's operation is guaranteed or non-guaranteed based on an implementation choice of a user, and indicates a name of an object, a time that the object is written, and a number of bytes of the object, and handling the requestor's operation using compare and swap instructions;

determining whether the requestor's operation is successful or unsuccessful; and deleting an in-memory object.

12. The computer program product of claim 11, wherein determining that the notification describing the requestor's operation should be sent further comprises:

processing the requestor's operation; and determining that a requestor requires the notification describing the requestor's operation.

13. The computer program product of claim 12, further comprising;

writing the in-memory object in parallel with object metadata while processing the requestor's operation, wherein writing the in-memory object includes erasure coding the in-memory object and sending the in-memory object to a slicestores.

14. The computer program product of claim 11, wherein it is determined that the requestor's operation is successful, further comprising:

sending the notification to an external service; and determining whether sending the notification to the external service is successful or unsuccessful.

15. The computer program product of claim 14, wherein it is determined that sending the notification to the external service is unsuccessful, further comprising:

ensuring that a duplicate notification is not sent to a dispersed storage network memory location by writing the notification to the dispersed storage network memory location and deleting the in-memory object as a single atomic transaction.

* * * * *